March 6, 1934.    J. H. HUNT    1,950,245
VEHICLE WHEEL
Filed March 19, 1932
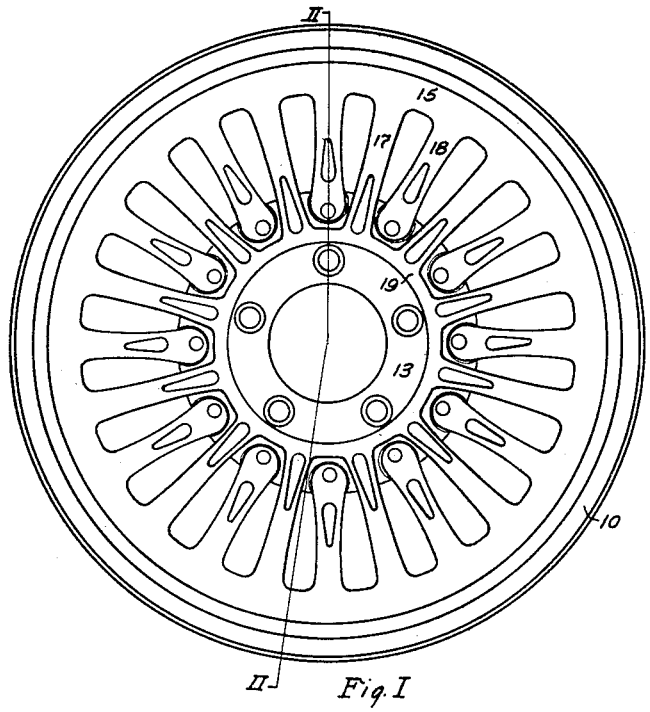
Fig. I
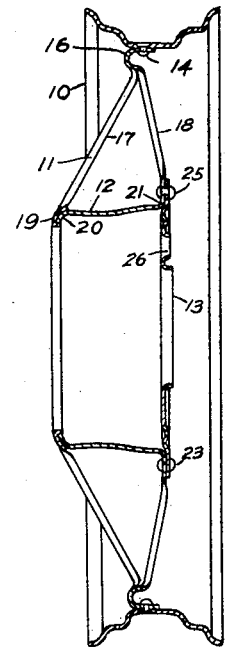
Fig II
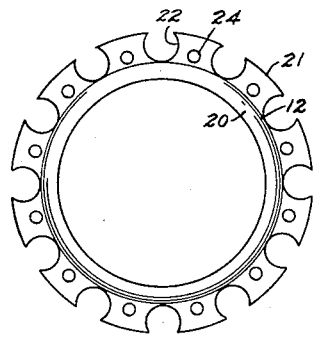
Fig. III
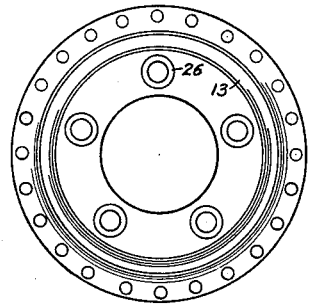
Fig. IV
INVENTOR.
J. Harold Hunt
BY
Carroll R. Jaber
HIS ATTORNEY.

Patented Mar. 6, 1934

1,950,245

UNITED STATES PATENT OFFICE 1,950,245

VEHICLE WHEEL

J. Harold Hunt, Lansing, Mich., assignor to Motor Wheel Corporation, Lansing, Mich., a corporation of Michigan Application March 19, 1932, Serial No. 599,916

6 Claims. (Cl. 301—64)

This invention relates to vehicle wheels and more particularly to a novel improvement in hub shells especially adapted for use in combination with vehicle wheels embodying two series of spoke members, the inner extremities of which are secured to the opposite extremities of the hub shell.

One form of the present invention is illustrated in the accompanying drawing in which:

Fig. 1 is a side view in elevation of a vehicle wheel embodying the invention;

Fig. 2 is a cross sectional view taken substantially on the line II—II of Figure 1 in the direction of the arrows;

Fig. 3 is a front view in elevation of the barrel portion of the hub shell; and

Fig. 4 is a front view in elevation of the back plate which is secured to the barrel portion of the hub shell.

The vehicle wheel herein shown as embodying the invention comprises a tire carrying rim member 10, a body or spider portion 11, and a hub shell 12 having a backing plate 13 secured thereto. While the rim section 10 shown in the accompanying drawing is of the drop center type it should be understood that any other type of rim or felloe might be used if desired. The body portion 11, as shown in Fig. 2 is preferably secured to the rim member 10 by means of a plurality of rivets 14.

The body 11 is preferably formed from a single sheet of metal as described in my co-pending application, Serial No. 576,792. It consists of an outer peripheral portion 15 flanged as indicated at 16 and a plurality of spokes 17 and 18 alternately bent away from each other at their inner extremities to form two series of spokes secured to the hub shell in a manner to be described presently. The inner extremities of the spokes 17 are preferably integrally connected by means of the annular portion 19 as best shown in Fig. 1. The inner extremity of the spokes 18 are not joined together and are preferably shorter than the spokes 17.

The hub shell 12 is of substantially cylindrical formation, having an inturned flange 20 at one extremity and an out-turned flange 21 at its opposite extremity. In this regard the hub shell herein shown differs from the conventional hub shell which normally has inturned flanges at both extremities. In the conventional hub shell the inturned flange at the inner extremity of the hub shell, or the extremity adjacent the vehicle to which the wheel is attached, substantially closes the opening through the hub shell and is provided with openings whereby a brake drum may be secured thereto.

Considerable difficulty has been experienced in assembling a conventional hub shell with a wheel spider of the type herein shown and described because of the difference in length between the two series of spokes forming the spider. Since the spokes at one extremity are shorter than the other, one end of the hub shell must necessarily be of greater diameter than the other. Consequently, it is impossible to insert a conventional hub shell into a spider of this type in a manner whereby one series of spokes may be secured to the inturned flange at one end and the other series of spokes secured to the inturned flange at the other end of the hub shell.

This invention provides a hub shell construction which eliminates the difficulty just described. This is accomplished by forming a plurality of properly spaced apart cut out portions or slots 22 in the outwardly extending flange 21 at one extremity of the hub shell 12. The back plate 13 is secured to the flange portion 21 of the hub shell 12 in any suitable manner, as by rivets 23 extending through the openings 24 in the flange 21 and similar openings in the back plate 13. The back plate 13 is of a suitable size so that the outer periphery thereof substantially coincides with the outer periphery of the flange portion 21. Accordingly the back plate closes the cut out portions or slots 22 in the flange 21 when it is secured thereto.

After the back plate 13 has been secured to the hub shell 12, as just described, the hub shell may then be inserted into the wheel spider from the back side thereof. The extremities of the spokes 18 are fitted into the openings or cut out portions 22 of the back flange 21 and are secured to the back plate 13 by any suitable means such as the rivets 25 shown in Fig. 2. The spokes 18 are of substantially the same thickness as the back flange 21 whereby the ends thereof substantially replace the portions cut away to form the opening 22. The inner extremity of the spokes 17 are secured to the hub shell 12 by bending the annular portion 19 formed integrally with the spokes 17 over the inwardly extending flange 21 and securing it thereto, preferably by welding.

Due to the complementary formation of the annular portion 19 and the flange 20, the welding of these parts together may be dispensed with, if desired. The back plate, as best shown in Figs. 2 and 3, is provided with suitable openings 26 whereby a conventional brake drum may be secured thereto by the use of suitable securing bolts.

From the foregoing description it will be apparent that this invention provides a hub shell structure which is suitable for use in combination with wheel spiders including two series of spokes adapted to be secured to the opposite extremities of the hub shell. While only a single embodiment of the invention has been shown and described it should be understood that the invention is not limited thereto, but that it is co-extensive with the scope of the appended claims.

I claim:

1. A vehicle wheel comprising a hub shell having a plurality of spaced apart cut away portions, a backing plate secured directly to the hub shell and covering the cut away portions, and a plurality of spokes fitted into the cut out portions and secured to the backing plate independently of the hub shell.

2. A vehicle wheel comprising a hub shell having a flanged edge formed with a plurality of slotted openings therein, a backing plate secured to the hub shell flange and positioned to close the aforesaid openings, and a plurality of spokes integrally connected together at their outer extremities and having their inner extremities fitted into the said openings and secured to the backing plate.

3. A vehicle wheel comprising a hub shell having a plurality of spaced apart slots in one edge thereof, a backing plate secured to the slotted edge of the hub shell, and a wheel spider including a plurality of spokes secured together at their outer extremities and alternately bent in opposite direction at their inner extremities, one series of the spokes having their inner extremities fitted into the aforesaid slots and secured to the backing plate and the other series of spokes having their inner extremities secured to the hub shell.

4. A vehicle wheel comprising a hub shell having an inturned flange at one extremity and an outwardly extending flange at the opposite extremity, the last mentioned flange being slotted at spaced intervals, a backing plate secured to the slotted flange, and a wheel spider including a rim portion having a plurality of spokes formed integrally therewith, the inner extremities of alternate spokes being bent in opposite directions, one series of spokes having their inner extremities fitted into the aforesaid slotted openings and secured to the back plate and the other series having their inner extremities secured to the inwardly turned hub shell flange.

5. A demountable at the hub vehicle wheel comprising a hub shell having a radially extending flange provided with a plurality of peripheral cut away portions, a backing plate which serves as a bolting on flange secured to the hub shell whereby to cover said cut away portions, and a plurality of spokes each having its inner extremity fitted into one of said cut away portions and secured to the backing plate independently of the hub shell.

6. A vehicle wheel comprising a hub shell having a radially extending circular flange at one end thereof provided with spaced apart peripheral cut away portions, a backing plate of the same diameter as said flange secured to the flange whereby to cover said cut away portions, and a plurality of spokes each having its inner extremity fitted into one of said cut away portions and secured to the backing plate independently of the hub shell.

J. HAROLD HUNT.